United States Patent [19]

Siiberg

[11] 4,091,250
[45] May 23, 1978

[54] ELECTRO-MECHANICAL LIQUID LEVEL SENSOR

[75] Inventor: Hemming Siiberg, Summit, N.J.

[73] Assignee: Wagner Electric Corporation, Parsippany, N.J.

[21] Appl. No.: 739,810

[22] Filed: Nov. 8, 1976

[51] Int. Cl.² .................................. H01H 35/18
[52] U.S. Cl. .......................... 200/84 C; 73/308; 340/244 A
[58] Field of Search ............ 200/84 R, 84 C, 61.2; 340/244 R, 244 A, 244 C, 244 E, 52 C; 73/308, 319, 322; 335/207

[56] References Cited

U.S. PATENT DOCUMENTS

| 2,142,680 | 1/1939 | Shrode | 200/84 C |
| 3,283,095 | 11/1966 | Iannelli | 200/84 C |
| 3,673,587 | 6/1972 | Baruch | 200/84 R |
| 4,020,481 | 4/1977 | Nakagawa | 200/84 C |

Primary Examiner—Gerald P. Tolin
Attorney, Agent, or Firm—Eyre, Mann, Lucas & Just

[57] ABSTRACT

An electro mechanical liquid level sensor is disclosed. The sensor comprises a magnetically operable switch which responds to liquid level in a container to complete a circuit for actuating a warning light or the like. The switch comprises an electrical contact operative in response to a magnetic force which is movable in accordance with liquid level whereby the circuit is completed upon a predetermined change in liquid level. The movable parts of the sensor are self-aligning. The movable contact may be maintained in the circuit closed position independent of liquid level until reset.

11 Claims, 5 Drawing Figures

ELECTRO-MECHANICAL LIQUID LEVEL SENSOR

FIELD OF THE INVENTION

The present invention relates to liquid level sensors and especially those for automotive applications such as in the reservoirs of brake master cylinders.

DESCRIPTION OF THE PRIOR ART

Liquid level sensors are well known in the art for sensing the height of liquid in a container. One of the problems in sensing levels in a liquid container which is subject to motion such as in automobile master brake cylinders is that the motion imparted to the liquid can give erroneous warnings of actual liquid level. This is caused especially when the container is, for example, only half full whereby substantial movement of the liquid in the container can result even from such minor actions as acceleration and braking of a motor vehicle. Additionally, many known sensors require careful alignment between parts in order for the senor to give an accurate indication of a predetermined change in liquid level. This adds time and expense to manufacturing and installation in that assembly of the container requires adjustments between parts which is particularly disadvantageous where the sensors are installed as aftermarket equipment or where the sensor is disturbed during refilling of the liquid container.

In accordance with the present invention, erroneous readings of liquid level are materially reduced and careful adjustment of sensor parts is obviated by employing a self-aligning device which is not as subject to liquid movement as are other type devices.

SUMMARY OF THE INVENTION

The present invention is embodied in and carried out by a liquid level sensor comprising a container for liquid; first magnetic means positioned in the container operative to be moved in a first direction over a first distance in response to the liquid level in the container; second magnetic means positioned at least partially in the container in a predetermined relationship with the first magnetic means operative to be moved in the first direction over at least a portion of the first distance by magnetic force between it and the first magnetic means in response to movement by the first magnetic means in the first direction; and an electrical switch positioned in the senor such that movement of the second magnetic means in the first direction is operative to open and close the electrical switch. The switch comprises electrical contacts and the switch and magnetic means are preferably arranged such that the contacts are closed by a positive force which is greater than the gravitational force associated with the switch and contacts. The force closing the contacts may be variable in accordance with liquid level in the container and may increase with a change in liquid level.

The sensor further comprises an electrical circuit which controls warning or other means in response to the liquid level in the container, the warning or other means being actuated and deactuated by a change in the state of the circuit caused by the making and breaking of electrical contact in the switch. In accordance with the present invention, the first and second magnetic means and electrical contacts in the switch are positioned such that upon movement of the second magnetic means to close the circuit, the second magnetic means is maintained in the closed circuit position independent of further liquid level change in the container. Means are provided for resetting the position of the second magnetic means to be dependent again upon liquid level change in the container. Further in accordance with the invention, the first magnetic means comprises ferromagnetic or magnetically attractable material secured to a float which rises and falls with liquid level in the container and the second magnetic means comprises magnetic material preferably a permanent magnet. The ferromagnetic material containing float and the permanent magnet material are positioned in predetermined relationship by guide means extending into the container. The float is positioned to move along the guide means thereby defining the first direction and the permanent magnet is also positioned to move along the guide means in the first direction. The guide means is preferably a hollow shaft; the float is preferably positioned concentrically about the shaft and the permanent magnet is preferably positioned concentrically within the shaft.

These and other aspects of the present invention will be more apparent from the following detailed description of the invention when considered in conjunction with the accompanying drawing.

BRIEF DESCRIPTION OF THE DRAWING

The invention is illustrated by way of example in the figures of the accompanying drawing in which like numerals refer to like parts and in which.

DESCRIPTION OF THE PREFERRED EMBODIMENT

Figure 1:
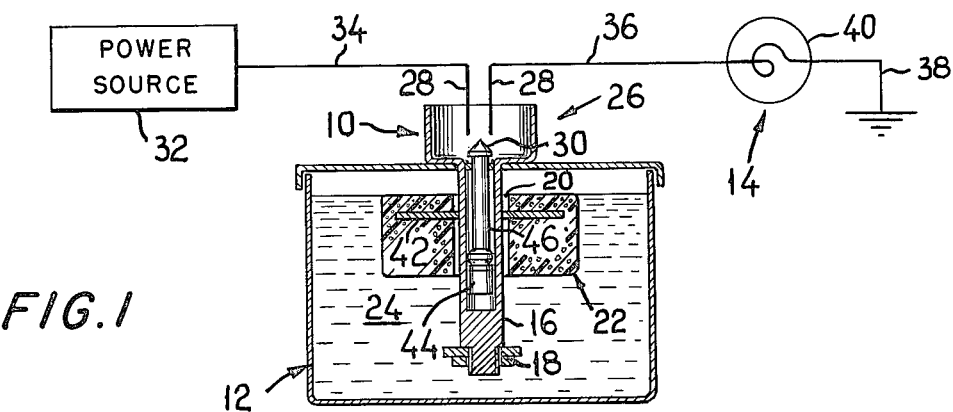
FIG. 1 shows diagrammatically the preferred embodiment of the invention including a schematic diagram of a warning circuit.
Figure 4:
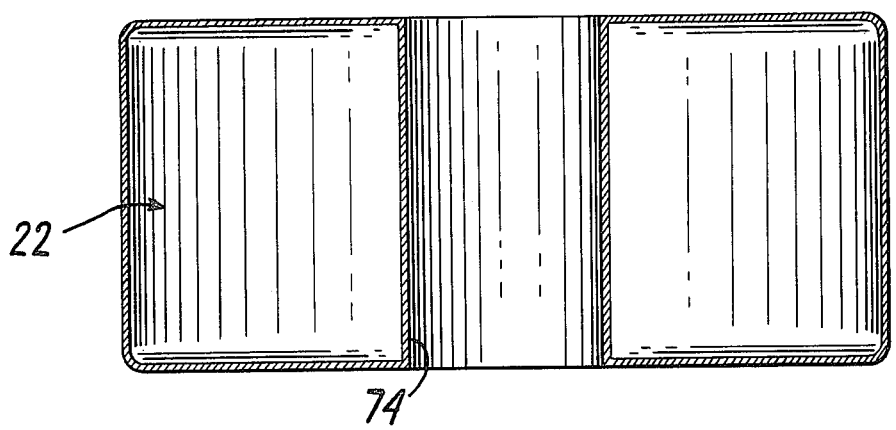
FIG. 4 shows a cross-sectional view of an alternative embodiment of a float wherein it is made of magnetically attractable material.
Figure 5:
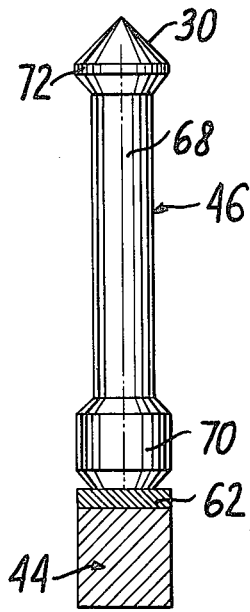
FIG. 5 shows an alternative embodiment wherein the rod carrying the contact is integral with the magnet.

Referring to FIG. 1, there is shown a sensor 10 according to the invention associated with fluid container 12 and electrical circuit 14. Sensor 10 comprises shaft 16 extending into container 12 and having opposed stops 18, 20 for limiting the upward and downward movement of the float 22. Float 22 is positioned for slidable linear movement along shaft 16 and is buoyant in fluid 24. While fluid 24 may be any liquid whose level it is desired to monitor, for purposes of illustrating the preferred embodiment, fluid 24 is suitably vehicle brake fluid. Float 22 is buoyant in brake fluid and not corroded thereby and is suitably made of plastic, stainless steel or the like and may be hollow. It will be understood that other materials contacting the fluid will similarly be selected as non corrosive. Float 22 moves up and down shaft 16 in accordance with the fluid level in the container. Sensor 10 further comprises switch 26 having stationary contacts 28 and movable bridge contact 30. Contacts 28 are part of electrical circuit 14 which comprises power source 32, (which may suitably be the battery in a vehicle) conductors 34, 36, 38, and lamp 40. One end of conductor 38 is grounded. FIG. 1 shows contacts 28 open which prevents the flow of current through lamp 40. As shown, float 22 contains therein ferromagnetic or magnetically attractable material 42 preferably iron. An alternative construction for the float as shown in FIG. 4 is to make it a hollow buoyant body of a magnetically attractable material such as ferromagnetic stainless steel. This has the advantage not only of reducing the number of pieces which need to be assembled but of also raising the temperature which the float can withstand, a highly desirable objective in motor vehicle applications. Fixedly mounted shaft 16 is hollow and houses for slidable linear movement therein a permanent magnet 44. Non-conductive rod 46 carries conductive contact 30 and rests on magnet 44 or, as shown in FIG. 5 may be integral therewith if desirable. Rod 46 and magnet 44 assume the position shown in FIG. 1 due to their weight and gravity. In operation, float 22 rises and falls with fluid level in the container. When the float has fallen a sufficient distance, ferromagnetic material 42 will attract magnet 44 upwards, overcoming the gravitational force. Movement of magnet 44 upwards in turn moves rod 46 and contact 30 upwards until contact 30 strikes and bridges contacts 28 (not shown in FIG. 1), thereby closing circuit 14 and permitting current to flow through lamp 40. Accordingly, a reduction in fluid level of a predetermined amount will light lamp 40.

Figure 2:
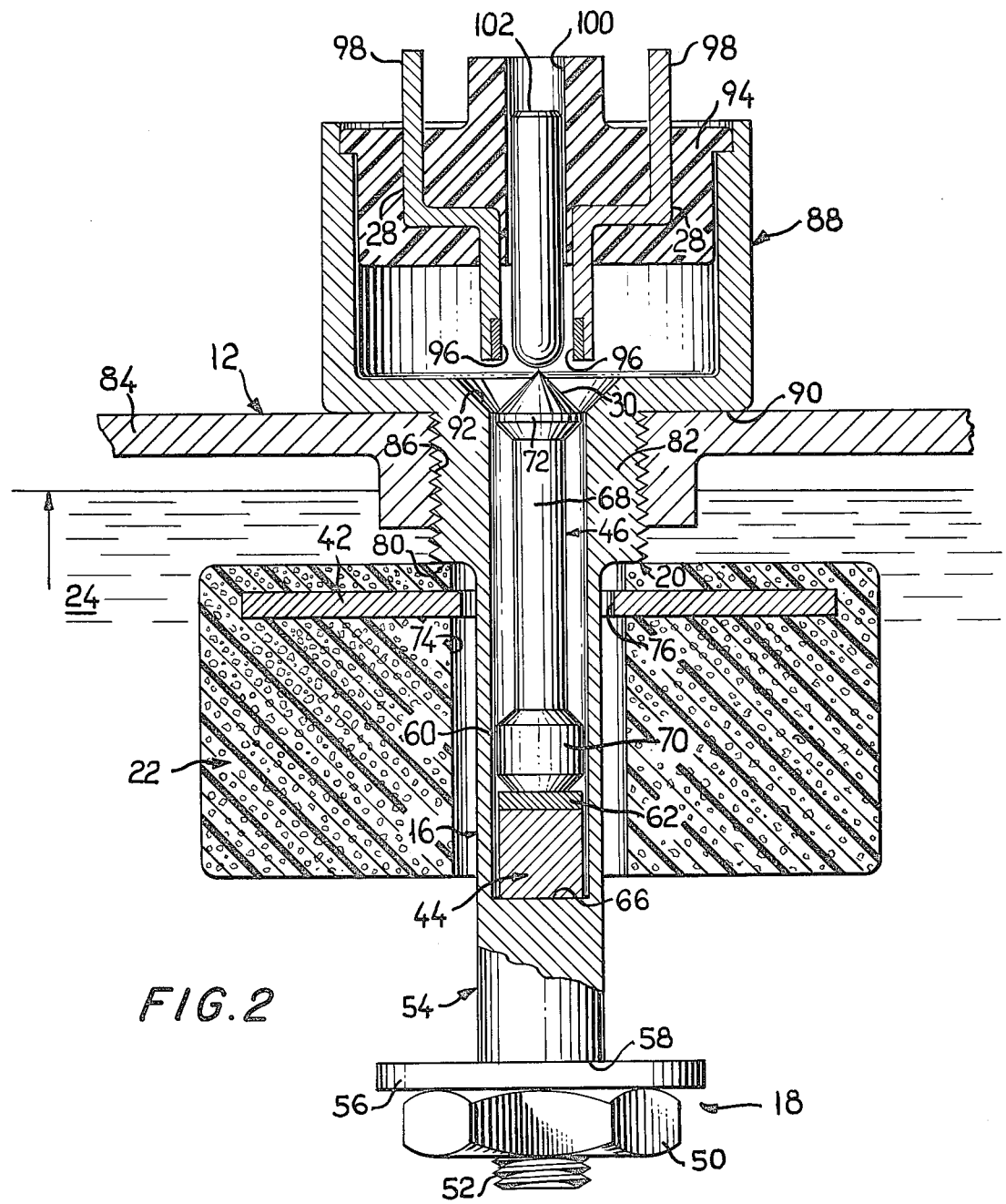
FIG. 2 is a cross-sectional side view of the sensor of the preferred embodiment of the invention in a position in which electrical contact in the switch is open and which shows the container broken-away.
Figure 3:
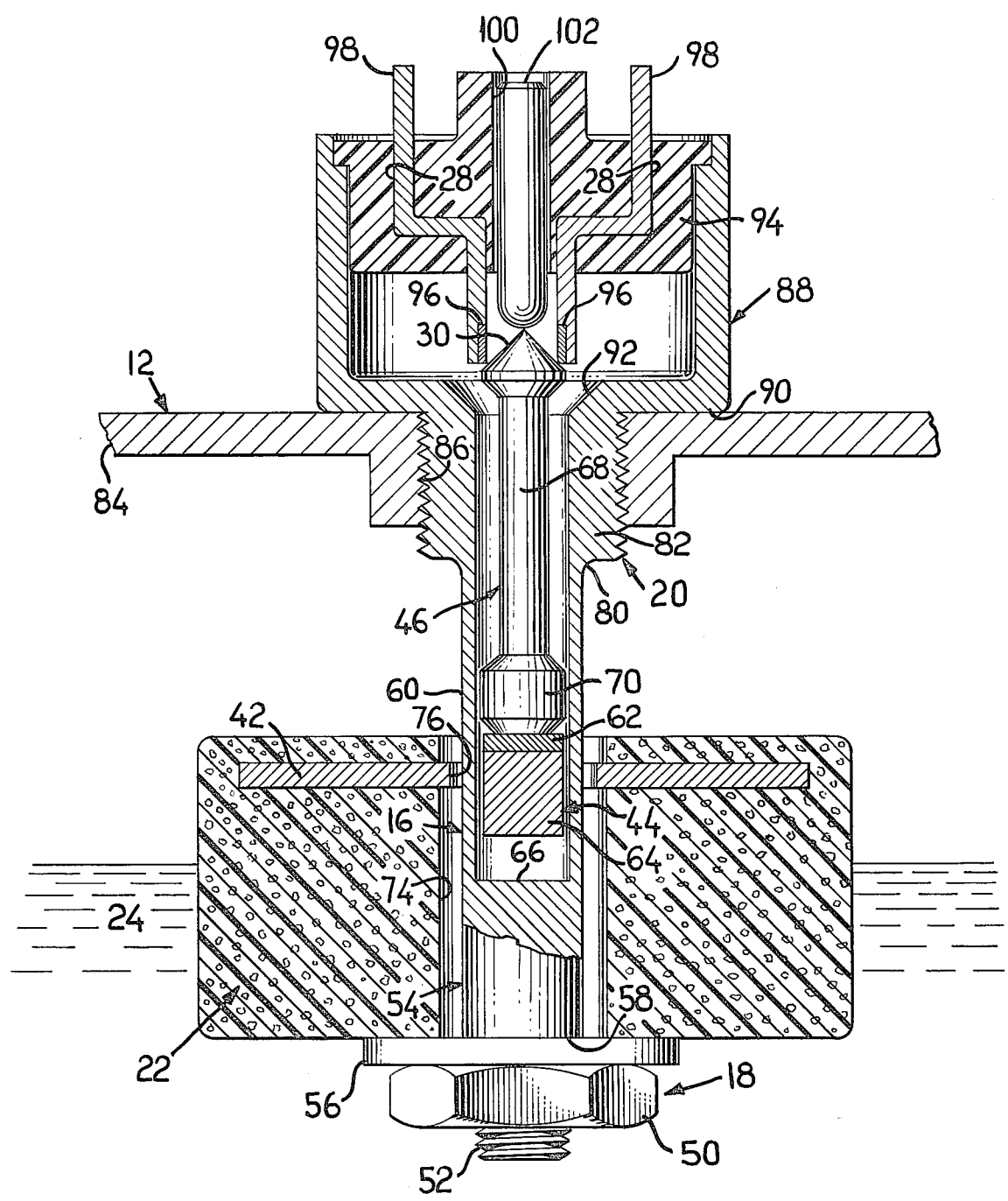
FIG. 3 shows the sensor as shown in FIG. 2 but in a position in which electrical contact of the switch is closed.

Referring now to FIGS. 2 and 3, the sensor of FIG. 1 is shown in more detail with the container 12 broken-away and the circuit 14 omitted. As there shown, stop 18 comprises nut 50 threadably or otherwise secured to shaft portion 52, which is of reduced diameter from the central portion 54 of shaft 16 which is formed of a non-magnetic material. Stop ring 56 is positioned to abut against shoulder 58 of the increased diameter shaft portion 54 and is held in place by nut 50. The upper portion 60 of the interior of central portion 54 of shaft 16 is hollow and positioned therein is pole piece 62 which is attached to permanent magnet 44. Magnet 44 freely rests on shoulder 66 forming the end of the hollow shaft interior. Rod 46 is freely movable within shaft 16 and rests on pole piece 62 due to its weight and gravity. Rod 46 comprises a reduced diameter center portion 68, lower portion 70, and contact portion 72. Lower portion 70 is sized to slide in shaft 16 and is of slightly smaller diameter than shaft 16 to maintain rod 46 essentially parallel to shaft 16. Upper portion 72 includes contact 30 to engage and bridge contacts 28 as shown in FIG. 3. Upper portion 72 is also sized slightly smaller in diameter than shaft 16. The reduced diameter of the center portion 68 is to reduce surface friction between the rod 46 and the interior surface of the shaft 16. Float 22 has an annular opening 74 of somewhat larger diameter than shaft 16. Float 22 is mounted to slide on the exterior of shaft 16. Disposed within float 22 is a torroidally shaped ferromagnetic disc or washer 42 having an annular opening 76 of diameter somewhat greater than that of shaft 16. Upper stop 20 comprises shoulder 80 formed by an increased diameter portion 82 of shaft 16. Float 22 is free to move along shaft 16 between stops 18 and 20 in accordance with fluid level. Shaft 16 is secured to container cover 84 through opening 86 and to switch housing 88. The diameter of switch housing 88 is greater than opening 86 so that shoulder 90 of the switch housing rests on container cover 84 and may be secured thereto and within opening 86 by thread, adhesive or by a press fit through opening 86 or by other known suitable means. Opening 92 in switch housing 88, opening 86 in container cover 84 and the interior of shaft 16 are in registration so that rod 16 is movable therethrough. Disposed in switch housing 88 is terminal base 94 in which are secured contacts 28. The lower ends 96 of contacts 28 which are to be contacted and bridged by contact 30 are preferably coated with a precious metal such as gold, silver, etc. and the same metal is preferably used on the contacting surface of bridge 30. The upper ends 98 of contacts 28 are connected to conductors 34 and 36 of electrical circuit 14 as shown schematically in FIG. 1. A terminal base 94 has a tubular opening 100 therethrough in registration with opening 92. Disposed in opening 100 is plunger 102 which rests on the tip of rod 16. The length of plunger 102 is such that it does not protrude from opening 100 when rod 16 and magnet 44 rest on abutment 66 as shown in FIG. 2 but does protrude when rod 16 is in the position shown in FIG. 3.

Operation of the apparatus shown in FIGS. 2 and 3 is generally as described hereinbefore for FIG. 1. Referring to FIG. 2, fluid 24 is above a predetermined minimum level and float 22 is buoyed up against stop. In this position, the magnetic force between magnet 44 and ferromagnetic disc 42 is of insufficient magnitude to overcome the gravitational force associated with the combined weights of magent 44, rod 46 and plunger 102. Accordingly, contact 30 remains below contacts 28 in a non-bridging position. This prevents the flow of current through circuit 14 and lamp 40 is not illuminated. As the fluid level in container 12 begins to fall, float 22 remains buoyed up against stop 20 and will remain in this position until the level falls further and below stop 20 so that float 22 will begin to move down shaft 16. However, the magnetic force between magnet 44 and ferromagnetic disc 42 will not be sufficient to lift the magnet, rod 46 and plunger 102 until the fluid level approaches a predetermined level. Referring now to FIG. 3, when the fluid level has reached the predetermined level float 22 has moved down shaft 16 to the point that the magnetic force between magnet 44 and ferromagnetic disc 42 is of sufficient magnitude to lift rod 46 so that contact 30 bridges contacts 28 thereby permitting current to flow and illuminate lamp 40. As contact 30 bridges contacts 28, plunger 102 is raised and protrudes from terminal base 94. The position of contacts 28 is chosen to limit the upward motion of rod 46 and contact 30. Limiting the stroke of rod 46 will always produce a positive contact pressure between contacts 28 and 30. The size and material of magnet 44 and ferromagnetic material 42 and the size, material and buoyancy of float 22 are preferably chosen such that the magnetic force between the magnet and the ferromagnetic disc is greater than the buoyant force of the float even when the container is full of fluid. Therefore, when the fluid level is raised to that shown in FIG. 2, float 22 and the magnet, rod and plunger will remain in the positions shown in FIG. 3. To allow float 22 to again rise in accordance with fluid level, plunger 102 is depressed to position magnet 44 a sufficient distance below ferromagnetic disc 42 such that the buoyant force of the float dominates over the magnetic force. Thus, once the fluid level falls to a predetermined level, the sensor is locked in a circuit completing state until reset by plunger 102 regardless of fluid level. This is highly advantageous in that once the fluid level has dropped to a predetermined point the warning indicator will be continuously actuated and there will be no opening and closing of contacts on a rough road surface which might indicate to a driver a malfunctioning warning light rather than a low liquid level.

In accordance with the invention, positioning of stop 18, ferromagnetic material 42 and magnet 44 will determine the fluid level at which the warning means will be actuated. Once so determined, the sensor is completely self-aligned and requires no periodic adjustments or alignment and the alignment is not disturbed by refilling the container. As mentioned hereinbefore, the sensor according to the invention may advantageously be used to monitor vehicle brake fluid and is essentially unaffected by normal vehicle movement and vibration because; (a) it is self-aligning (b) both the float and floating contact (rod) are guided by the shaft, (c) there is a positive force associated with closing the contacts, and (d) there is a positive lock position to indicate a low level. The sensor is simple in design, rugged and essentially unaffected by fluid conductivity or temperature. In accordance with the invention, the sensor may be fitted to brake fluid reservoirs for aftermarket application.

While the preferred embodiment describes the invention with respect to monitoring brake fluid level, it is to be understood that the invention has application in the monitoring of other liquids.

The advantages of the present invention, as well as certain changes and modifications of the disclosed embodiment thereof, will be readily apparent to those skilled in the art. It is the applicant's intention to cover by his claims all those changes and modifications which could be made to the embodiment of the invention herein chosen for the purposes of the disclosure without departing from the spirit and scope of the invention.

What is claimed is:

1. Liquid level sensor apparatus comprising:
   (a) a container for a liquid;
   (b) a hollow shaft vertically and fixedly positioned in said container;
   (c) a rod positioned in and movable in said hollow shaft between a first position and a second position one of which closes an electrical circuit and the other of which opens an electrical circuit;
   (d) a float assembly exterior of and about the said hollow shaft and movable up and down along said hollow shaft in response to the liquid level in said container;
   (e) first and second magnetic members magnetically attractable to each other, one said magnetic member being carried by said float assembly and movable therewith and the other said magnetic member being in said hollow shaft in a position to raise said rod when said member is magnetically attracted;
   (f) the magnetic attraction between said members being insufficient to move said rod when the liquid level is above a predetermined level whereby the rod remains in its first position but being sufficient to effect the raising of said rod into its second position when the liquid level in said container is below a predetermined level.

2. The apparatus of claim 1 wherein the hollow shaft is mounted to the top of said container.

3. The apparatus of claim 1 wherein the magnetic member in said hollow shaft is a permanent magnet.

4. The apparatus of claim 3 wherein the permanent magnet is separate from and below the said rod.

5. The apparatus of claim 1 wherein the rod and the magnetic member in the hollow shaft are an integral structure.

6. The apparatus of claim 1 wherein the magnetic member carried by the float is of torroidally shaped magnetically attractable material.

7. The apparatus of claim 1 wherein the float assembly is a hollow body formed from a magnetically attractable material.

8. The apparatus of claim 1 further including stop means on the hollow shaft to limit the travel of the float assembly.

9. The apparatus of claim 1 wherein the magnetic attraction between the two magnetic members when established by said liquid level falling below said predetermined level is greater than the buoyant force on said float caused by an increase in said liquid level to its normal operating level.

10. The apparatus of claim 9 further including means for manually overcoming the magnetic attraction.

11. The apparatus of claim 1 wherein said electrical circuit is closed by the bridging of a part of contacts by a bridging member carried by said rod.

* * * * *

UNITED STATES PATENT AND TRADEMARK OFFICE
CERTIFICATE OF CORRECTION

PATENT NO. : 4,091,250
DATED : May 23, 1978
INVENTOR(S) : Hemming Siiberg

It is certified that error appears in the above-identified patent and that said Letters Patent are hereby corrected as shown below:

Column 1, line 22, "senor" should read --sensor--.

Column 1, line 49, "senor" should read --sensor--.

Signed and Sealed this

Twentieth Day of February 1979

[SEAL]

Attest:

RUTH C. MASON
Attesting Officer

DONALD W. BANNER
Commissioner of Patents and Trademarks